A. CROWE & R. W. KIDSTON.
ARMORED RESILIENT TIRE.
APPLICATION FILED JUNE 4, 1912.
1,094,307.
Patented Apr. 21, 1914.
2 SHEETS—SHEET 1.
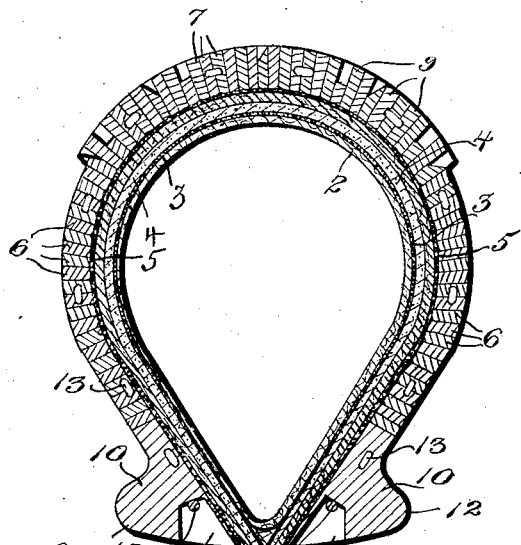
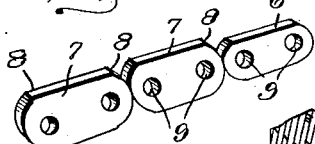
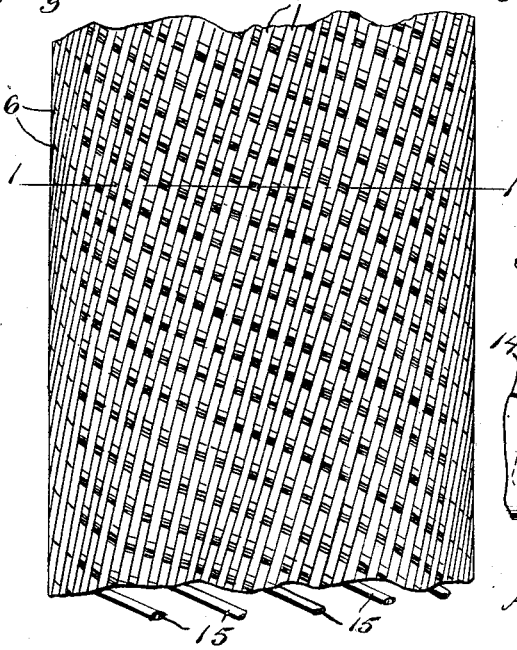
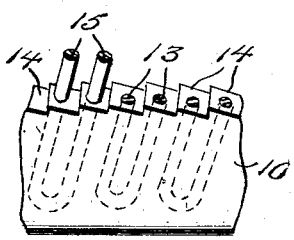
Inventors
Alexander Crowe,
R. W. Kidston.
Witnesses
By
Attorneys.

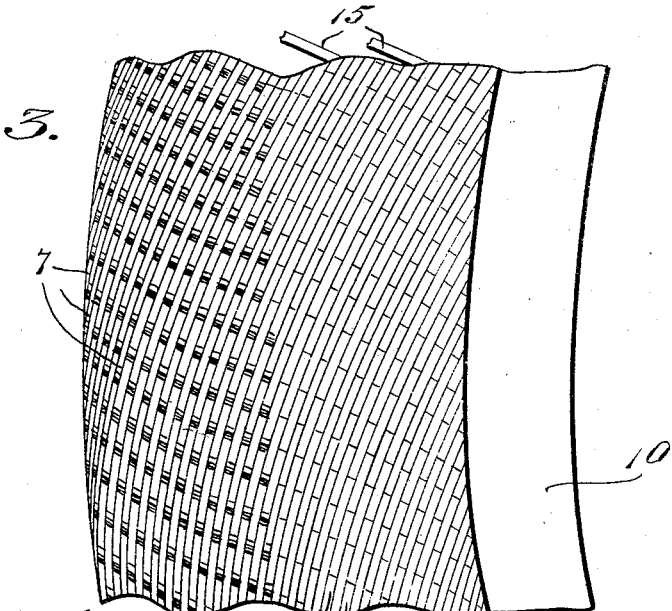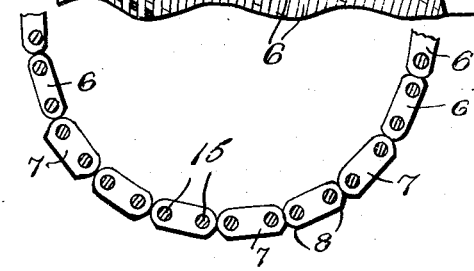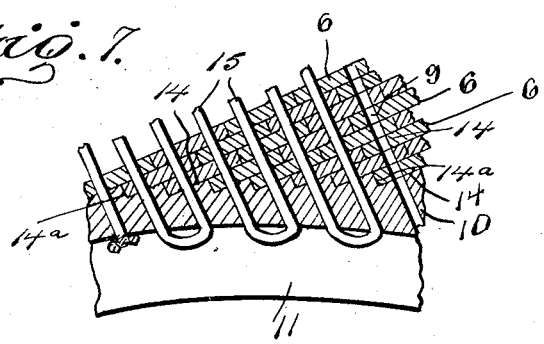

UNITED STATES PATENT OFFICE.

ALEXANDER CROWE AND ROBERT W. KIDSTON, OF YOUNGSTOWN, OHIO.

ARMORED RESILIENT TIRE.

1,094,307.  Specification of Letters Patent.  Patented Apr. 21, 1914.

Application filed June 4, 1912. Serial No. 701,637.

*To all whom it may concern:*

Be it known that we, ALEXANDER CROWE and ROBERT W. KIDSTON, citizens of the United States, residing at Youngstown, in the county of Mahoning and State of Ohio, have invented certain new and useful Improvements in Armored Resilient Tires, of which the following is a specification.

Our invention relates to vehicle tires and particularly to armored tires designed for motorcycles, bicycles, etc.

One object of our invention is the provision of a tire which while entirely punctureproof, shall have a great degree of flexibility in the general direction of the periphery of the wheel.

A further object is to provide a tire composed of tread sections extending neither parallel nor transverse to the peripheral axis of the tire but diagonally thereto whereby a greater tractive power is secured, and at the same time a greater resistance to any sidewise slipping or skidding.

A further object is the provision of a flexible metallic tire armor in which the links extend in a bias direction so that the fabric composed of the links shall not pull out of shape.

A further object is the provision of a tire in which the links forming the protective covering of the tire are held against sidewise movement by solid abutments, the tire yet having longitudinal flexibility to a marked degree.

A further object is the provision of a tire composed of metallic links in which all the links are threaded on one continuous strand of wire binding the links into one coherent fabric.

A further object is the provision of a tire of this character in which the links extend diagonally to the peripheral axis of the tire and in which the links break joints or overlap each other.

A further object is the provision of a tire formed of flexible sections or links firmly connected to annular bases of relatively hard and solid material, so that a firm connection is secured between the flexible armored portion of the tire and the wheel rim.

Our invention is illustrated in the accompanying drawings in which:

Figure 1 is a transverse section of a tire constructed in accordance with our invention and taken on the line 1—1 of Fig. 2. Fig. 2 is a face view of a portion of a tire constructed in accordance with our invention, the tire being broken away at one end to show the supporting wires or cables. Fig. 3 is a fragmentary side elevation of the tire shown in Figs. 1 and 2. Fig. 4 is a perspective view of a fragment of one of the clencher bases, a fragment of wire cable being illustrated. Fig. 5 is a perspective detail view of the two forms of links used for the tread portion and body portion of the tire. Fig. 6 is an elevation of a series of these links, the wires being shown in section. Fig. 7 is a fragmentary sectional view of a portion of one of the annular bases, the adjacent links and the wires upon which the links are threaded and by which they are bound to the clencher bases.

Corresponding and like parts are referred to in the following description and indicated in all the views of the accompanying drawings by the same reference characters.

In these figures we have illustrated a complete tire comprising an inner pneumatic tube, an outer tire or armored sheath and intervening layers of fabric. We wish it understood, however, that we do not wish to be limited to the construction of the inner tube or the use of the intervening layers of any particular character as the exterior tire or armored sheath might be used with any interior construction.

In the drawings, 2 designates an inner tube of any ordinary or desired form and shown as being a pneumatic tube. Surrounding the inner tube is a layer of waterproof canvas designated 3. Surrounding this canvas layer is a layer of asbestos 4 which insulates the inner tube and prevents the conduction of heat thereto. Exterior to the asbestos layer is another layer of waterproof canvas designated 5, and exterior to this canvas is the armored sheath. This armored sheath is entirely composed of links 6 and 7, the shape of these links being illustrated in Fig. 5, 6 being the ordinary link used upon the opposite sides of the tire while 7 designates the form of link used along the tread portion of the tire. There is no difference in the operation of these links except that on the tread portion of the tire the links 7 are of greater height and have relatively sharp corners 8 so that when a longitudinal series of links is disposed diagonally along the tire, the curvature will cause the relatively sharp corners 8 to project and thus provide for a greater tractive engagement of the tire with the ground than would be otherwise possible. Each of these links, either 6 or 7, is provided with two perforations designated 9. The links as shown are approximately oblong in form with rounded ends and these perforations are preferably placed adjacent to the rounded ends of the links.

Disposed at both margins of the tire are the annular bases 10 of usual form and preferably of metal. Each of these bases is formed on its inner face with a circumferential recess designated 11. The bases extend outward on each side as at 12 so as to be engaged by the flanges of the wheel rim.

The annular bases are formed with a plurality of parallel perforations designated 13 which extend into the base diagonally to its longitudinal axis. The outer face of each base is stepped as designated at 14, the face of each stepped portion being disposed diagonally to the longitudinal axis of the base and at right angles to the perforations 13.

Threaded through the perforations 13 and through the perforations 9 of the links is a continuous wire cable of any desired size and designated 15. It will be seen from Fig. 7 that this wire cable starts at one point on the inside of one annular base, extends through the adjacent perforation 13 in the base, extends diagonally across the armored portion of the tire passing through the perforations 9 in the links, extends through the opposite annular base, is again carried up through the next adjacent perforation in advance, again carried over the tire and so on, this continuous wire cable or strand extending back and forth diagonally across the tire and constituting practically the weft thread of a fabric, the warp elements of which, if they can be so called, being composed of the links 6 and 7.

It is to be particularly noted that there is but one wire cable 15 and that it is threaded through the annular bases, and that the portion which extends along the annular bases is housed within the recesses 11 so that the wire cable itself is not at any point exposed.

It is further to be noted, and plainly shown in Fig. 2, that the links 4 and 6 must extend at right angles to the cable and therefore must extend along the tire diagonally to the peripheral axis thereof. It will further be noted from Fig. 2 that each line of links breaks joints with the next adjacent series or line of links on each side and thus it will be seen that each transversely extending stretch of wire cable extends alternately through the right hand end of one link and the left hand end of the next adjacent link in the path of the cable. The cable therefore acts to bind the links to each other in a flexible or pivotal engagement and to bind the links into a flexible fabric.

Inasmuch as each line of links runs diagonally to the peripheral axis of the tire, each line of links is gradually curved from the point of engagement with one base to the point of engagement with the other base and that therefore the links 7 which form the tread portion of the tire, as before remarked, are so disposed that the sharp corners 8 of the links are projected so as to strongly engage the roadbed. At the same time each of the links formed as it is with rounded ends will prevent the entrance of a nail, tack or other sharp object between the links and the puncture of the inner tube.

It will be seen that in order to provide for a firm engagement between the end links of each longitudinally extending series of links, it is necessary to form the bases 12 with the seats 14 extending diagonally to the longitudinal axis of the base but parallel to the line of the longitudinal series of links. It will likewise be seen that the end links of each series rest flat against these seats 14 and further that the looped wire cables draw the links together laterally so that the flat side of one link bears firmly against the flat side of the next adjacent link and at the same time holds the bases firmly at each side of the mass of links so that the links cannot spread laterally. Each link is slightly tapered from its outer face toward its inner face so that the armored portion of the tire may curve laterally over the inner tire.

It will be noted that not only do the end links of each longitudinally extending series of links rest firmly upon the seats 14, but that the extremity of each end link bears against an abutment $14^a$ which defines the end of each seat, and that thus a firm bearing is secured for the longitudinally extending series of links and for the armored portion of the tire as a whole which relieves to a large extent the strain upon the wire cables and tends to prevent any stretching of the wire cables under the tractive power of the wheel.

Because of the fact that the links are strung upon a wire cable, it is possible to open the outer tire to any desired extent for the insertion of the inner tire, and a great degree of longitudinal as well as lateral flexibility is secured. Our improved tire is puncture-proof, thoroughly flexible, conforms to the movements of the inner tire and is readily attached or detached whenever desired.

What we claim is:

1. A protective covering for vehicle tires composed of a plurality of series of protective elements extending diagonally across the face of the tire from one margin of the tire to the opposite margin thereof, each of said elements having flat side faces and being of greater depth than width, the side faces of one series of elements lying against and abutting the side faces of the next adjacent series of elements, and flexible connections extending through and connecting the several series of elements.

2. A protective covering for vehicle tires including a plurality of series of links extending diagonally across the face of the tire, the links of one series lying parallel to the links of the next adjacent series, and flexible strands extending diagonally across the tire at right angles to the direction of the series of links and passing through said links and flexibly connecting one series of links to the other series.

3. A protective covering for vehicle tires including a plurality of series of flat-sided links extending parallel to each other, the series of links extending diagonally across the tire, the links having flat contacting sides, and strands of cable extending diagonally at right angles to the direction of the links and passing through said links and flexibly connecting the links to each other.

4. A protective covering for vehicle tires including parallel bases and a plurality of series of links, each link having flat contacting sides, the links extending diagonally across the tire from one of said bases to the other, and flexible connections attached at their ends to said bases and each extending through the several series of links and flexibly connecting the links to each other.

5. A protective covering for vehicle tires including a plurality of longitudinally extending series of links, and a continuous flexible cable extending diagonally back and forth across the tire upon which said links are threaded.

6. A protective covering for vehicle tires including a plurality of longitudinally extending series of links extending diagonally with relation to the peripheral axis of the covering, and flexible strands extending diagonally across the tire covering at right angles to the direction of the links and upon which said links are threaded.

7. A protective covering for vehicle tires including parallel marginal bases, a plurality of series of flat-sided links disposed between the bases and extending diagonally thereto and diagonally across the protective covering, and a strand of flexible material extending back and forth across the covering, passing through the ends of said links and connected to the bases.

8. A protective covering for vehicle tires consisting of oppositely disposed parallel marginal bases, a plurality of diagonally extending series of flat sided links disposed between the bases, the links of one series bearing against the links of the next adjacent series and breaking joints therewith, and a continuous cable formed in a series of transversely extending loops, said loops being disposed diagonally with relation to the axis of the tire and said bases and at right angles to the length of the links, each loop being threaded through the bases and the stretches of each loop being threaded through the links and flexibly connecting them to each other.

9. A protective covering for vehicle tires including oppositely disposed, longitudinally extending parallel marginal annular bases having a series of diagonally extending perforations, a continuous cable formed into a series of transversely extending loops and threaded through said perforations, and a plurality of series of flat sided links through which the stretches of said cable pass, said links being arranged diagonally with respect to the bases and the bases being formed with seats for the end links of each series.

10. A protective covering for vehicle tires including oppositely disposed, parallel marginal bases, the outer face of each base being formed with a series of seats, the faces of which are angularly disposed to the longitudinal axis of the base and the bases being also formed with a plurality of perforations extending through each seat to the inner face of the base and at right angles to the plane of the seat, a continuous cable looped transversely across the space between the bases and threaded through said perforations, and a plurality of series of links perforated at each end and through the perforations of which said cable passes, the links of one series breaking joints with the links of the next adjacent series, the end links of each series resting upon the said seats formed on the bases.

11. A vehicle tire including an inner tube and an outer tube or covering, comprising oppositely disposed parallel marginal bases, each base having a longitudinally extending recess formed upon its basal face, and passages extending from each recess to the outer face, a cable extending back and forth over the outer face of the inner tire and being threaded through the perforations of said bases, and parallel series of links through which the flights of said cable pass and by which they are flexibly connected to the bases and to each other.

In testimony whereof we affix our signatures in presence of two witnesses.

ALEXANDER CROWE. [L. S.]
ROBERT W. KIDSTON. [L. S.]

Witnesses:
H. A. ERNST,
R. C. HUEY.